US007007026B2

(12) United States Patent
Wilkinson et al.

(10) Patent No.: US 7,007,026 B2
(45) Date of Patent: Feb. 28, 2006

(54) SYSTEM FOR CONTROLLING ACCESS TO AND GENERATION OF LOCALIZED APPLICATION VALUES

(75) Inventors: Francis M. Wilkinson, Palm Beach (AU); Alan John Davis, Bracknell (GB); Bart Dijkstra, Jisp (NL)

(73) Assignee: Sun Microsystems, Inc., Palo Alto, CA (US)

( * ) Notice: Subject to any disclaimer, the term of this patent is extended or adjusted under 35 U.S.C. 154(b) by 531 days.

(21) Appl. No.: 10/023,361

(22) Filed: Dec. 14, 2001

(65) Prior Publication Data

US 2003/0115186 A1   Jun. 19, 2003

(51) Int. Cl.
*G06F 17/30* (2006.01)

(52) U.S. Cl. .................. 707/10; 707/3; 707/4; 707/102; 707/104

(58) Field of Classification Search .................... 707/3, 707/10, 1, 9, 2, 6, 7, 203, 204, 205; 709/215, 709/217, 244, 238; 711/202; 370/401; 340/995.1; 382/306
See application file for complete search history.

(56) References Cited

U.S. PATENT DOCUMENTS

| 5,918,013 | A  | * | 6/1999  | Mighdoll et al. ............ 709/217 |
| 6,026,474 | A  | * | 2/2000  | Carter et al. ................. 711/202 |
| 6,360,273 | B1 | * | 3/2002  | Beurket et al. ............. 709/244 |
| 6,601,073 | B1 | * | 7/2003  | Robare ..................... 340/995.1 |
| 6,623,529 | B1 | * | 9/2003  | Lakritz ........................ 715/536 |
| 6,674,924 | B1 | * | 1/2004  | Wright et al. ............... 382/306 |
| 6,760,756 | B1 | * | 7/2004  | Davis et al. ................. 709/215 |
| 6,795,820 | B1 | * | 9/2004  | Barnett ........................... 707/3 |
| 2001/0049677 | A1 | * | 12/2001 | Talib et al. ..................... 707/3 |
| 2002/0154642 | A1 | * | 10/2002 | Hagirahim et al. ......... 370/401 |
| 2002/0156917 | A1 | * | 10/2002 | Nye ........................... 709/238 |
| 2002/0161767 | A1 | * | 10/2002 | Shapiro et al. ................. 707/9 |
| 2003/0174648 | A1 | * | 9/2003  | Wang et al. ................. 370/235 |
| 2004/0139049 | A1 | * | 7/2004  | Hancock et al. ............... 707/1 |
| 2004/0230461 | A1 | * | 11/2004 | Talib et al. ..................... 705/7 |

\* cited by examiner

*Primary Examiner*—Thuy N. Pardo
(74) *Attorney, Agent, or Firm*—Kent A. Lembke; William J. Kubida; Hogan & Hartson LLP (57) ABSTRACT

A system and method for controlling generation of and access to localized application values to applications. The system includes an administrative interface linked to a running application and to a communications network that is configured for receiving requests for application data from the application. The interface responds by determining obtaining localized application values from a cache or if not cached, from a central database or repository of network localized application values that is also linked to the communications network. Code or mechanisms are provided for creating and populating data structures or objects for storage in the cache. Mechanisms or background threads are also provided for monitoring changes to localized application values in the repository and automatically updating element values in the cache as and when they change.

18 Claims, 6 Drawing Sheets

SYSTEM FOR CONTROLLING ACCESS TO AND GENERATION OF LOCALIZED APPLICATION VALUES

BACKGROUND OF THE INVENTION

1. Field of the Invention

The present invention relates, in general, to the generation, storage, and use of localized values and data by a software application, and, more particularly, to a computer system including administrative interfaces linked to applications operating in a computer network with the interfaces controlling generation of and access to localized application values and/or data stored in a centralized data store and, at least partially, in local memory.

2. Relevant Background

Applications are software programs that are used extensively in computers and computer networks to carry out a wide variety of useful tasks. Word processors, graphics programs, communications packages, spreadsheets, and database managers are well-known applications. To operate effectively, many applications utilize environmental variables or properties and other data or values that are localized to allow the application to have improved usefulness to a particular user. For example, if an application is used internationally, the application must be able to display text in a language useful to the user. An application may use localized properties and values to display information and function based on the geographic location of the user, based on the language preference of the user, or based on other user-specified or location-specific criteria.

Existing applications typically are configured to retrieve localized data from local system memory that is stored in either static files or databases for more dynamic values. A number of operating problems are associated with the present method of managing localized variables. Generally, an application will utilize an interface or program to handle accessing localized values in static files. For example, in Java™ systems, Resource Bundles are utilized by an application to access static property files, but the application is responsible for linking property files to a ResourceBundle. Other programming language environments use similar techniques that require the application to be aware of the location and/or identification of localization information and the localization options utilized for such values.

Further, inheritance of localized variables from one application to another application is typically not supported or difficult to implement by the programmer of the application. Instead of using inheritance, the localized values files will contain complete sets of needed values and as a result, contain many duplicate values or even conflicting values. Even if inheritance of localized values is provided between applications, presently each of the separate localized values static files is modified making inheritance inefficient and difficult to see its effects.

Existing methods of controlling access to and generation of localized application values often require the application to be shutdown and restarted to be able to make use of updated or new values. The changes to localized values tend to be all or nothing with all values required for an application being updated as a set, such as at the release of a new software package or the release of given database state. It is difficult to update one or selected sets of application values in existing systems. For example, for databases to support more flexible releases, additional attributes for each value need to be provided to reflect the value's state and this complicates select statements used to retrieve values. Further, localized values are typically limited to simple data structures, such as text strings and properties, because these are considered a low common denominator, but when more complex structures are desired, these data structures must be combined.

When a relational database management system (RDBMS) is associated with each application in a network, more dynamic localized data can be utilized but the data tends to be either a one dimensional (such as language only) or a flat, two dimensional (such as geographic specific and language) structure and fails to account for or allow inheritance, which would require complex select statements from the application. Additionally, applications that utilize a RDBMS are slow as a select statement must be issued to obtain each localized value, which results in numerous selects being issued. Alternatively, the RDBMS is used to feed values to static files that the application then accesses more directly. This alternative embodiment can still result in considerable delay.

Hence, there remains a need for an improved method and system for efficiently controlling generation of and access to localized application values, and preferably, such an improved method and system would be readily implemented within a distributed computer network in which numerous applications are operated on geographically diverse computer systems and would enable localized values to be easily updated by users rather than only highly trained information technology personnel and programmers.

SUMMARY OF THE INVENTION

The present invention provides a localized value control system that includes an interface linked to an application that is operable to obtain sets of pre-localized values, such as values in the form of Java™ objects, eXtensible Markup language (XML) fragments, eXtensible Stylesheet Language (XSL) stylesheets and other forms. The values are extracted by the interface from one or more central repositories of localized values. Each value repository includes a library of named localized elements indexed by the applications that utilize the elements, which allows the interface to retrieve the correct set of localized values for a particular application. The repository also includes localized values for each localizable element indexed by geographical area, language, or localization criteria to enable the interface to select an appropriate localized value for an element based on a specific combination of localization criteria (such as a particular combination of language and geographical area).

In one embodiment, a hierarchical structure of geographical areas and a list of languages used in each geographical area are used to control the process of selecting the appropriate localized value. According to another aspect of the invention, each interface maintains recently used application values in a local memory (such as a fully normalized cache) to provide rapid access to the application. The local memory is preferably kept current and consistent with the repository by a background process that monitors the repository for changes to relevant values and updates the local memory values. The control system further includes security mechanisms to control user access to viewing and modifying all or portions of the localized values based on a user role assigned to each user.

In this manner, the present invention is operable to address numerous problems with prior methods of accessing localized application values and data. The localized value control system is useful for supplying different types of localized application data ranging from simple text strings and property values to localized pages that combine many simpler localized values, e.g., by using localized XSL stylesheets. The system is operable to supply dynamic and consistent localized values to an application without requiring the application to be stopped or restarted to update or add values. The system supports sharing of localized values among applications and allows non-technical staff to modify localized values with access being controlled by assigned user roles that may vary by geographical area (i.e., a user may have more than one user role within the system).

The system preferably supports the concept of inheritance of values from one application to another application unless overridden to localize the value. For example, a worldwide support telephone number may be inherited and in some applications, overridden locally to provide a telephone number useful in a particular geographic region. In the system, the application simply requests a set of values from the interface which operates to retrieve the appropriate localized application values from the local memory or central repository. Further, the system is operable to allow one or more value to be released without modifying the entire set of application values. Performance is enhanced by defining sets or hierarchies of application values to allow sets of relevant values to be retrieved when a single value is requested by the application, i.e., the system anticipates the application's future needs for data by relating or linking at least a portion of the localized application values.

DETAILED DESCRIPTION OF THE PREFERRED EMBODIMENTS

Figure 1:
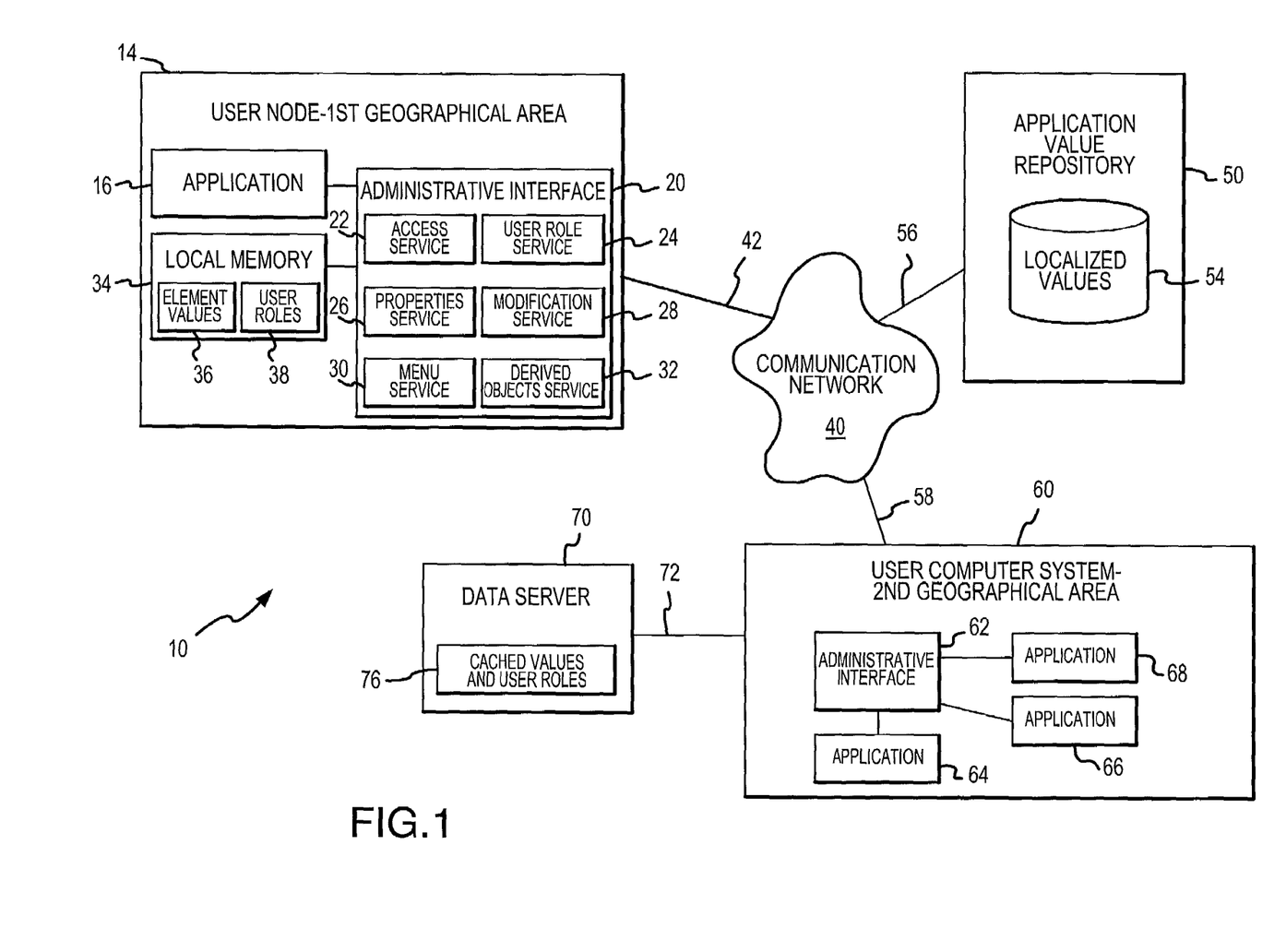
FIG. 1 illustrates a localized application value control system of the present invention including the administrative interface which manages generation of and access to application element values.

To provide a full understanding of the present invention, the invention is first described generally as operating in a network environment of a localized application value control system 10, as shown in FIG. 1. The control system 10 includes an exemplary user node 14 in a first geographical area, a user computer system 60 in a second geographical area, and a central application value repository 50. Each of these devices is linked by the communications network 40 via communications links 42, 56, and 58.

The description of the invention then proceeds to more specific examples of how the control system 10 operates to facilitate providing localized application values to applications such as illustrated applications 16, 64, 66, and 68. From the general description of the control system 10 and data flow during generating and accessing localized application values, one skilled in the art will readily understand that the invention applies generally to the distribution of services within any distributed computing network or within a more simple computer system (such as a system of computers within a single office building).

Hence, the present invention applies specifically to a client-server model and generally to all communications systems configured for providing localized application values to one or more applications. In the following description, Java™ programming language examples may be utilized to facilitate understanding of the concepts of the invention but it should be understood that one skilled in the art would readily be able to apply the features of the invention to other programming environments which are believed covered by the breadth of this disclosure.

FIG. 1 illustrates one embodiment of a control system 10 useful for efficiently providing up-to-date, localized application values to a plurality of client devices running applications located throughout a computer network. The applications may be any software program or package useful for performing a task on a computing device such as a web browser, word processor, graphical packages, communications managers, database managers, and the like. The specific applications utilized by user node 14 and user computer system 60 are not as important as the features of the invention that allow the control system 10 to effectively generate, selectively update, and share application values within a computer network such as that illustrated in FIG. 1.

As illustrated, the localized application value control system 10 includes a user node 14 (although numerous user nodes 14 or clients will typically be provided) and a user computer system 60 that are in communication with an application value repository 50, which is used to store shared localized values 54 and other information, via the communications network 40 (e.g., the Internet, a LAN, a WAN, and the like) and communication links 42, 56, 58. In the following discussion, computer and network devices, such as user node 14, user computer system 60, application value repository 50, and data server 70 are described in relation to their function rather than as being limited to particular electronic devices and computer architectures. To practice the invention, the computer devices and network devices may be any devices useful for providing the described functions, including well-known data processing and communication devices and systems such as personal digital assistants, personal, laptop, and notebook computers with processing, memory, and input/output components, and server devices configured to maintain and then transmit digital data over a communications network. The communication links 42, 56, 58 may be any suitable data communication link, wired or wireless, for transferring digital data between two electronic devices. Data is typically communicated in digital format following standard communication and transfer protocols, such as TCP/IP, HTTP, HTTPS and the like, but this is not intended as a limitation of the invention.

The user node 14 is positioned within a first geographical area and the user computer system 60 is positioned within a second, different geographical area to illustrate how the system 10 facilitates sharing of application values within a geographically diverse network while still facilitating inheritancy of system values and localization by overriding particular system values. Note, however, that the set of geographical areas that a user node 14, 60 or administrative interface 20, 62 serves is not limited by a physical location (with a typical administrative interface 20, 62 serving multiple geographical areas). The set of geographical areas (and also, languages) that are cached in local memory 34 and/or repository 50 is determined by selections made by users of the applications 16, 64, 66, 68 which can lead to a particular node or system 14, 60 serving a large number of geographical areas (and/or languages).

The user computer system 60 is illustrated to include three applications 64, 66, and 68 that are all linked to a single administrative interface 62 which functions to receive requests for localized values from the applications 64, 66, and 68. The administrative interface 62 acts to generate and retrieve the appropriate localized values from the application value repository 50 and its localized values 54 and/or from the data server 70 which stores cached values and user roles 76 via communications link 72. The administrative interface 62 (whose operation is discussed more fully with relation to interface 20) may be an application programming interface (API) or other type of interface that is linked to the application 64, 66, 68 code and functions to retrieve values from repository 50, cache retrieved values, provide the values to the applications, and periodically update and remove cached values.

Operation of the control system 10 will now be more fully explained with reference to the user node 14 which is simplified for ease of explanation to include a single administrative interface 20 that is linked to the code of a single application 16 (but, of course, more applications 16 may be serviced by interface 20 or by additional interfaces) and a single local memory 34. The local memory may be cache memory within the node 14 or a separate memory device accessible by the administrative interface 20. The local memory 34 is illustrated to store element values 36 (such as element value objects) and user roles 38 (such as application user objects) that are utilized relatively often by the application 16.

The local memory 34 is typically populated with values and user roles stored in localized values 54 in the application value repository 50. The repository 50 may be a database server or other data storage device that is linked directly to the node 14 or system 60 or linked via a communications network 40 as illustrated in FIG. 1. The geographic location of the repository 50 is not limiting to the invention and more than one repository 50 may be linked to the network 40 and accessed by the administrative interfaces 20, 62. The localized values 54 may be stored in the form of a database or other useful data storage structure to allow efficient indexing and retrieval of data. The source of the data used to populate the local memory 34 is stored for later use by the interface 20.

Generally, many values are cached in memory 34 with a smaller portion of the values such as file types being stored to disk. Significantly, element values are shared among applications served by the administrative interface 20 (i.e., administrative interface 62 can provide the same values to more than one application 64, 66, 68) to save space in local memory 34. In this manner, an application is provided with a reference to a value rather than a copy of the value if the value is used in more than one application or language or geographical area.

The administrative interface 20 functions to accept requests for data from the application 16 and retrieve the required data or values from the local memory 34 and/or the repository 50. In a preferred embodiment, the interface 20 is a set of mechanisms (such as thin classes in a Java programming environment) that provide access to values 36, 38 held within the local memory 34 or cache. The mechanisms of the interface 20 hold indirect references that allow them to perform a lookup against the cached values when requested by the application 16 rather than holding references directly to the cached objects 36, 38. As a result of this reference scheme, the application 16 is automatically and on an ongoing basis provided with updated values 36, 38 from the local memory 34. This is important because the control system 10 preferably operates to monitor changes to the localized values 54 in the repository 50 and responds by updating the cached values 36, 38 in local memory 34.

As illustrated, the administrative interface 20 includes a set of mechanisms that operate in combination to provide many of the unique features of the control system 10. The mechanisms include, but are not limited to, an access service 22, a user role service 24, a properties service 26, a modification service 28, a menu service 30, and a derived objects service 32.

The access service 22 functions to provide access to localized application values 36 and/or localized values 54. To facilitate retrieval of a localized value for an element, the application 16 supplies an application name, a geographical area code or identifier, a preferred language (e.g., a language code), a staged flag, and an element name. The staged flag is used to indicate whether the value returned by the interface 20 can be an unreleased value (i.e., a value that has been selectively modified prior to a full release of a software version or database state). In this manner, the access service 22 is able to provide unreleased values to select users prior to the full release to the general population of users.

Significantly, the user role service 24 functions to provide access by the application 16 to user role information. The administrative interface 20 allows a number of profiles to be assigned to users which are useful in granting each user with one or more roles within different geographical regions or areas of the world. For example, a user may be able to view only localized information in one area while being assigned a role that allows viewing and modification of localized values within a second area. To obtain the user role localized information, the user role service 24 receives a user name or identifier and a geographical area identifier or code. In some embodiments, the user role service 24 further functions to determine whether the user is able to view staged localized application data or only released localized application data. This may be accomplished by the service 24 checking to determine if the user has a role assigned to a particular application for seeing staged information.

As further explanation of the general usage of the user role service 24, the role assigned to an application 92 (shown in FIG. 2 in local memory 34) for seeing staged data is stored within the application value repository 50. The general use of the user role service 24 does not include providing an application 92 name to the service. Instead, applications 16 simply invent roles for different restricted actions that a user must have in order to perform some function. The user role service 24 checks to see if a user has the required role in a particular geographical area. The modification service 28 specifies profiles for users that in turn grant roles within different geographical areas.

The properties service 26 is similar to the access service 22 except it functions to return localized property values, e.g., system and environment variables and parameters. As will be appreciated by those skilled in the art, this feature of the control system 10 of providing localized properties is important and powerful and more importantly, the localized properties are stored in the centralized repository 50 but are accessible by the interface 20 as if they were held and maintained in local files. With the interface 20 and the properties service 26, the control system 10 can be operated to efficiently perform complex reconfigurations of multiple remote systems (such as user node 14 and user system 60)

simply by modifying the localized properties 54 stored in the repository 50 and then operating the interface 20, 62 to update cached values which reconfigures the application 16, 64, 66, 68 as these updated properties are requested. For example, if the user node 14 obtains its connection information from a localized property set or object provided by the interface 20, the localized property set or object only needs to be modified once at the repository 50 and the interface 20 operates to provide this modified information to the application 16 as it is requested.

To ensure that current data is provided to the application 16, the administrative interface 20 includes the modification service 28. The modification service 28 is operable to monitor the repository 50 for changes to the localized values 54 and to flag that a change has been made. The modification service 28 may be configured to periodically refresh the local memory 34 when a value in the local memory 34 is changed in the localized values 54 of the repository 50. The modification service 50 may alternatively be configured to flag to the application 16 or the interface 20 when a request is made by the application 16 to a value that has been altered at the repository 50 but not yet at the local memory 34. In a further arrangement, the modification service 28 and/or the interface 20 may be configured to block a value request from the application 16 until the local memory 34 is updated to reflect changes at the repository 50.

The menu service 30 is provided in the interface 20 to provide a dynamic menu structure for the application 16. In a preferred embodiment, the provided menu will be generated based on the user role to display only options, functions, and data that are accessible by that user. The menu service 30 is operable to use the localized values 36 to localize displayed text, such as titles, and to localize the actions to be performed within the menu.

The derived objects service 32 is included to construct and store data structures or objects made out of localized values. These constructed structures or objects are replaced when localized values are modified. The derived objects service 32 is configured to maintain the generic characteristics of the service 32 and to provide flexibility for future uses of the particular service 32. With this goal in mind, the derived objects service 32 is not aware of specific processes and information utilized in the construction process of the data structures. In order to make use of the derived objects service 32, a user of the service 32 provides the specifics of the object that the service 32 is to derive or construct.

Typically, the object includes certain features so that the constructed object can be properly managed by the service 32. For example, the object may implement a standard method that returns the name of the element(s) it is based on so the service 32 knows to pass in the localized element of this value upon construction and to keep track (i.e., monitor the constructed object) of this passed value so that the derived or constructed object can be invalidated if the value changes. Such value tracking enables the derived objects service 32 to refresh or update constructed objects as soon as the localized values the objects are based on are changed in the system 10. The constructed object based on old values is discarded and a new object is derived or constructed. Preferably, this refreshing process is performed by the service 32 in a fashion that is transparent to the operator of the user node 14.

In FIG. 1, the local memory 34 is illustrated to indicate that element values and user roles are cached or stored to support the administrative interface 20 in providing localized values to the application 16. Typically, however, the local memory 34 or cache would contain a number of caches, e.g., cache classes, each holding data structures or objects in order to supply element values and user roles to applications. An exemplary, but not limiting, illustration of this preferred embodiment of the local memory 34 is provided in FIG. 2.

Figure 2:
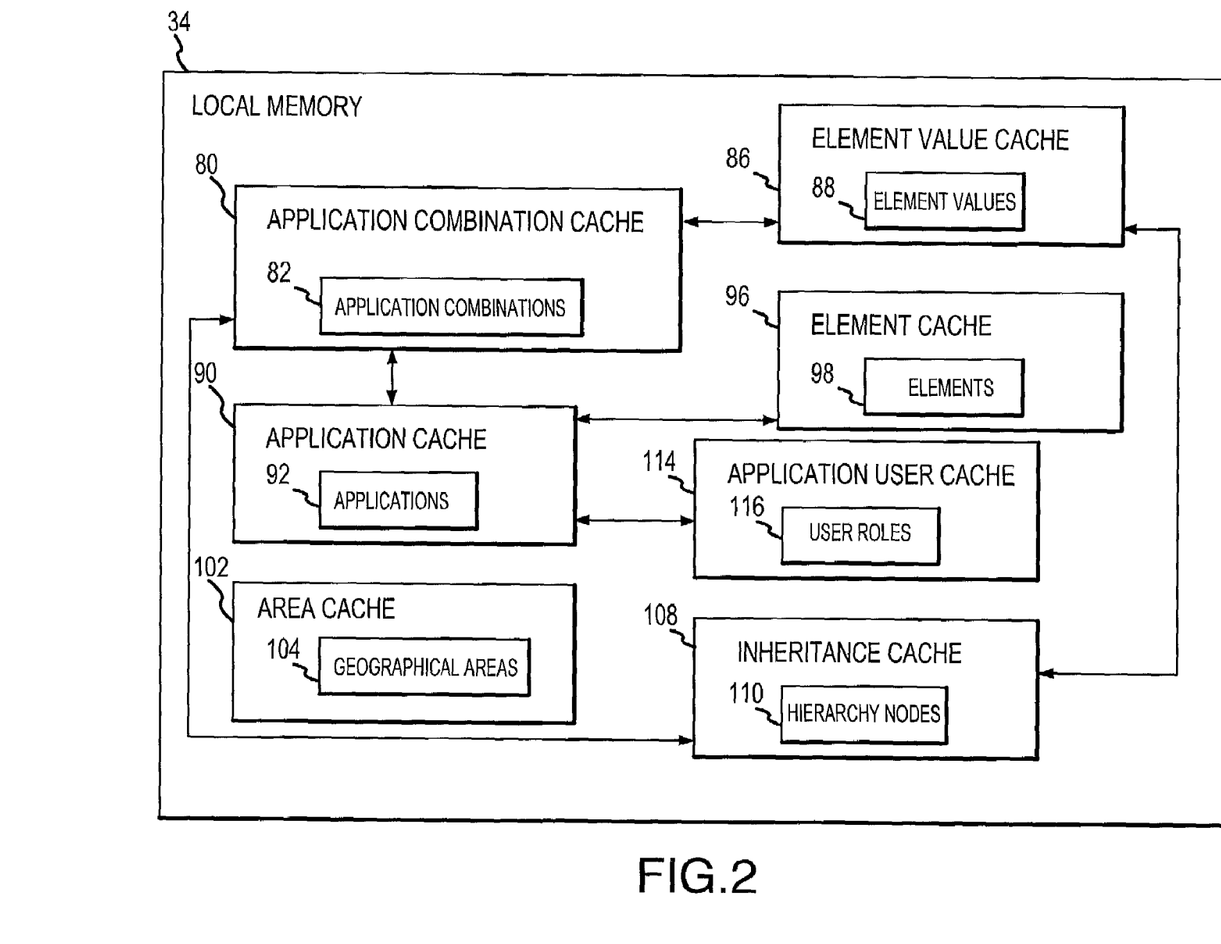
FIG. 2 illustrates an exemplary configuration of a local memory of FIG. 1 used to cache localized values and application data.

As shown, the application combination cache 80 holds application combinations 82 that represent each combination of application name, geographical area identifier or code, language identifier or code, and staged flag requested by the application 16 via the access service 22 and the properties service 26. The application combinations 82 are preferably indexed on one or more of these four values. Each application combination 82 contains an indexed list of element values 88 that are appropriate for the given combination of application name, language code, geographical area code, and staged flag. The indexed list preferably includes a single element value 88 for each element 98 in the named application. As will become clear, the included element values 88 are specific ones for the specified geographical area, language, and staged indication.

If a request is made for the default language or an unsupported language in any geographical area, an additional application combination 82 is created with a null (or blank) language code, which allows the default and list of supported languages within each country to be changed in the administrative interface 20 without problems arising in the local memory 34. A null language application combination 82 simplifies the task of adding new application combinations 82 after the default language has been changed but before the local memory 34 has been updated to reflect the change.

The element value cache 86 holds element values 88 that might be useful to each application combination 82 in the application combination cache 80. Generally, this includes element values 88 for higher level (or inclusive) geographical areas even if there is a more specific value available. The element value cache 86 includes element values 88 for the required language or the null language (a language independent value) for each node in the geographical hierarchy required by each application combination 82. The element values 88 are preferably indexed on a unique element value ID that allows the element values 88 to be updated from the repository 50 and on a combination of element ID, geographical area code, language code, and staged flag that allows checks to be made for the existence of element values 88 to create a list of element values 88 for a given application combination 82.

Figure 3:
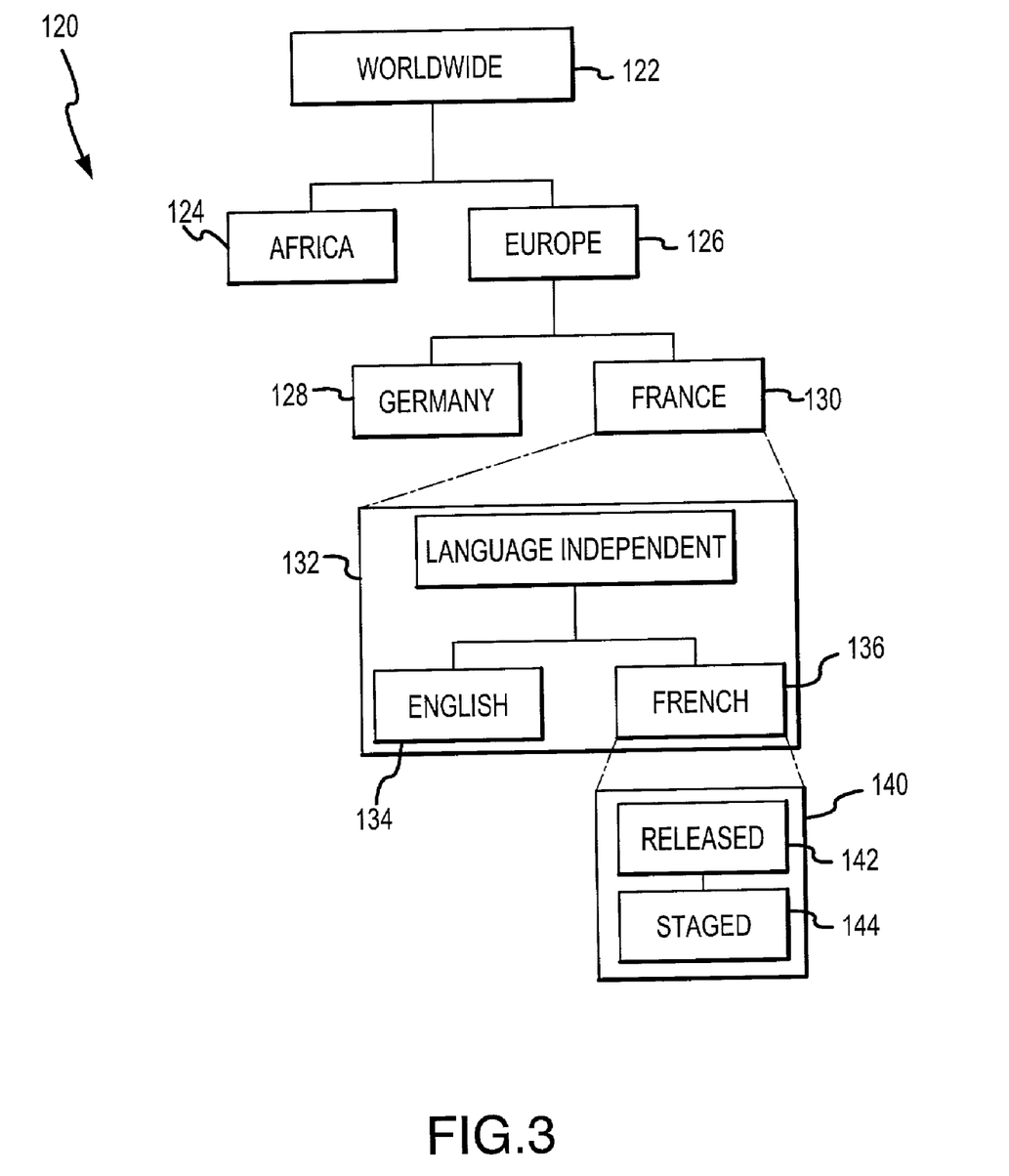
FIG. 3 is an exemplary hierarchy for inheritance processes within the control system of FIG. 1.

Each element value 88 holds a single localized value for a single node in the geographical, language, and staged hierarchy tree structure (such as the structure 120 shown in FIG. 3). Most element values 88 are shared when they are linked into an application combination 82, i.e., the application combination 82 simply takes a reference to the element value 88. If the element value 88 represents a file value, a copy is preferably made of both the element value 88 and the file. A temporary directory is used for file values held in the element value cache 86. Each of the application combinations 82 has a temporary directory into which a copy of the file value is stored. As will become clear, all the files for a single application combination 82 preferably exist in the same directory so they may refer to each other by relative path name.

Element values 88 are also created automatically for empty files, such as XML files, where there is no value for each element in the localized files 54 of the application value repository 50. An element value 88 may hold values in either a "final" state that may be returned directly via the interface 20 or in an initial "raw" state that is utilized to create or construct the final state of the value. The state of the held value is based on the element type. For example, if the element is an XSL stylesheet, the final state can be constructed by performing an XSL transformation to include localized values. Prior to the first return, the value is constructed to allow a late loading to take place for values that demand more resources to create.

According to an important feature of the invention, the application cache 90 holds applications 92 that represent individual applications 16 (i.e., a conceptual application of elements rather than an actual application such as a help module). The cache 90 views each conceptual application 92 as a set of elements 98. Each application 92 also has a role associated with it to indicate if the user may or may not view staged values in that application 92. The application cache 90 identifies all elements 98 within a given application hierarchy that belong to a particular application 92. Each application 92 represents a single application, such as application 16 (or a subset of an application 16, which in turn may be defined to include sub applications 92 in a heirarchy) and holds a list of element IDs and the role required to see staged data.

The applications 92 also maintain a list of application combinations 82 and user roles 116 that refer to each application 92, which allows the applications 92 to know when it can remove itself from the application cache 90. The applications 92 further provide the element value cache 86 with the list of application combinations 82 so the element value cache 86 may construct repository retrieval requests (such as SQL statements) to identify elements 98 and their values 88 required in the element value cache 86. In addition to the element IDs, the application combinations 82 preferably provide geographical area codes and language codes to limit the number of results from the repository retrieval requests.

The element cache 96 is a temporary cache that holds a list of elements 98. The cache 96 is constructed by the element value cache 86 in order to add (if required) new element values 88 when a new application combination 82 is added and also to update element values 88 for existing application combinations 82. The element cache 96 is built each time by looking at the existing element values 88. While the element cache 96 could be resident in local memory 34, it is typically built each time to avoid having to determine when elements 98 should be removed. The element cache 96 is used by the element value cache 86 to identify element values 88 that are no longer needed in the local memory 34 as elements have been removed from an application for which element values 54 are maintained in the repository 50. The element cache 96 is also used to create empty (or null) element values 88 when there is no value 54 in the repository 50 for a given application element. Each element 98 includes an identifier (i.e., an element ID), an element name, and element type information. The elements 98 are referenced by element values 88 to allow proper interpretation of their values.

The area cache 102 holds geographical areas 104 objects which each represent a single geographical area code. The geographical areas 104 are linked to their "parent area" or area that includes them (e.g., worldwide is a parent area to the United States which is a parent area to the state of Texas and so on) to form a hierarchy in the cache 102. The geographical areas 104 may each hold a list of language codes supported and a default language code to use if none is supplied in the request or if an unsupported language is requested. Only those geographical areas 104 used by application combinations 82 currently loaded in the local memory 34 are populated with language codes.

The complete list of geographical areas in the application value repository 50 is generally small so all nodes in the geographic hierarchy can be read into the area cache 102. The area cache 102 is accessed by the geographical area code. The element value cache 86 can be configured to rebuild itself if the geographic hierarchy is modified to avoid problems with missing or extraneous element values 88. The element value cache 86 then can force all application combinations 82 to be replaced to pick up any changes in inheritance of element values 88 from one geographical area to another.

The inheritance cache 108 is a temporary cache used to hold hierarchy nodes 110 and is used to return a reference to a hierarchy node 110 (and optionally to create one) given a geographical area code, a language code, and a staged flag. The hierarchy nodes 110 are temporary objects that each represents a node in the inheritance hierarchy for values (see FIG. 3). Each node 110 is defined by the combination of a geographical area code, a language code, and a staged flag. Each element value 88 and application combination 82 are aware of their place in this hierarchy and as a consequence, are able to create a hierarchy node 110 for themselves.

The nodes 110 are used by the element value cache 86 to determine which application combinations 82 are impacted by changes to element values 88. The list of changed (i.e., modified, new, or deleted) element values 88 is given to each application 92 to generate a list of hierarchy nodes 110 that the application 92 is concerned with. A hierarchy node 110 is added to the list if the application 92 contains an element for one of the modified element values 88. Each application combination 82 may then be asked if it uses any of the hierarchy nodes 110 for modified values. The application combination 82 does this simply by starting with its own combination of geographical area code, language code, and staged flag and checks to see if this node 110 is in the list of nodes returned by the application 92. If the node 110 is not in the list, the application combination 82 moves on to the next parent node 110 in the hierarchy until the top node (e.g., the worldwide, language independent, and released node) has been checked.

If the application combination 82 allows staged values, both staged and released nodes 110 in the hierarchy are checked and if not, only the released nodes 110 are checked. When an application combination 82 is building its list of element values 88, it performs a similar process for each element 98 by looking up the element value cache 86 to see if there is an element value 88. The application combination 82 starts with itself and works upward in the hierarchy until it reaches the top node 110. If an element value 88 is found it is added to its list and if not, a blank element value 88 of the correct type is added.

The application user cache 114 holds user roles 116 which include a list of roles within a given geographical area for a specific user. The user roles 116 represent each combination of application name, geographical area code, and user name and these three values are used for indexing the roles 116. The user roles 116 are requested via the user role service 24 of the interface 20. Generally, requests via the user role service 24 do not include an application 92 name, so the list of user roles 116 within a single geographical area is typically shared between different applications 16 regardless of the application 92 name.

Security of the localized values 54 and conceptual applications in the data server 70 and local memory 34 is provided by the control system 10 because in many computing environments numerous developers may have access to the repository 50. Typically, the security invoked by the control system 10 is based on the role assigned to the developer or user (which as discussed previously may vary based on the geographical area or based on other factors). In one embodiment, every application 92 (and sub-application) has an attribute that is used to identify a role the user must have in order to modify the application 92. The administrative interface 20 is then configured to verify if a user (or requester) has an appropriate role prior to allowing the user to modify any attributes or localized values of the application 92 or even link the application 92 to sub-applications (if the user has the correct role, the user can link to sub-applications without having the role of the sub-application).

Further security is provided by classifying each localizable value 54 (and/or element 98 in cache 96) by an element type, such as binary objects, environment properties, HTML files and fragments, XML files and fragments, text files and fragments, and the like. Every element type then has an attribute used to specify another role that users must have in order to modify localized values 54 (as well as 36 and 76) for elements of that type. Again, the administrative interface 20 is adapted to determine the role of the requesting user matches the required goal prior to allowing the user to modify the localized value of an element. In other words, the user must have all the necessary roles for the application linked to the elements and for the individual elements themselves. Further, localized values often are specific to a geographic area which leads to the security check that the user have the correct roles for that particular geographical area (i.e., a user may have roles that allow them to modify an application and element values in one geographic area but only modify some or none of the element values in another geographic area).

FIG. 3 illustrates a simple example of inheritance hierarchy 120 within the system 10. The inheritance hierarchy 120 includes a number of geographical area nodes 122, 124, 126, 128, 130 with the worldwide node 122 being the top node and parent of the Africa and Europe nodes 124 and 126. As shown for the France node 130, each geographical node includes a number of language nodes. The France node 130 includes a language independent node 132 that exists for every node in the hierarchy 120 and the languages supported by the geographical node (shown as an English node 134 and a French node 136 for the France node 130). Each of these language nodes in turn includes a released node 142 and a staged node 144. Element values are located at each node in the hierarchy 120 defined by its geographical area code, language code, and staged flag (i.e., released or staged).

When an application combination 82 constructs its indexed list of element values 88, it performs the following acts for each element 98 in the application 92. Starting with the application combination's 82 hierarchy node 110 value (such as France, French, and Staged) it progresses upward in the hierarchy 120 to each node until an element value 88 is found by performing a lookup against the element value cache 86. If an element value 88 is not found, a blank value of the requested type is used. The staged nodes 144 are only checked if the application combination 82 is flagged as staged but released nodes 142 are always checked.

Figure 4:
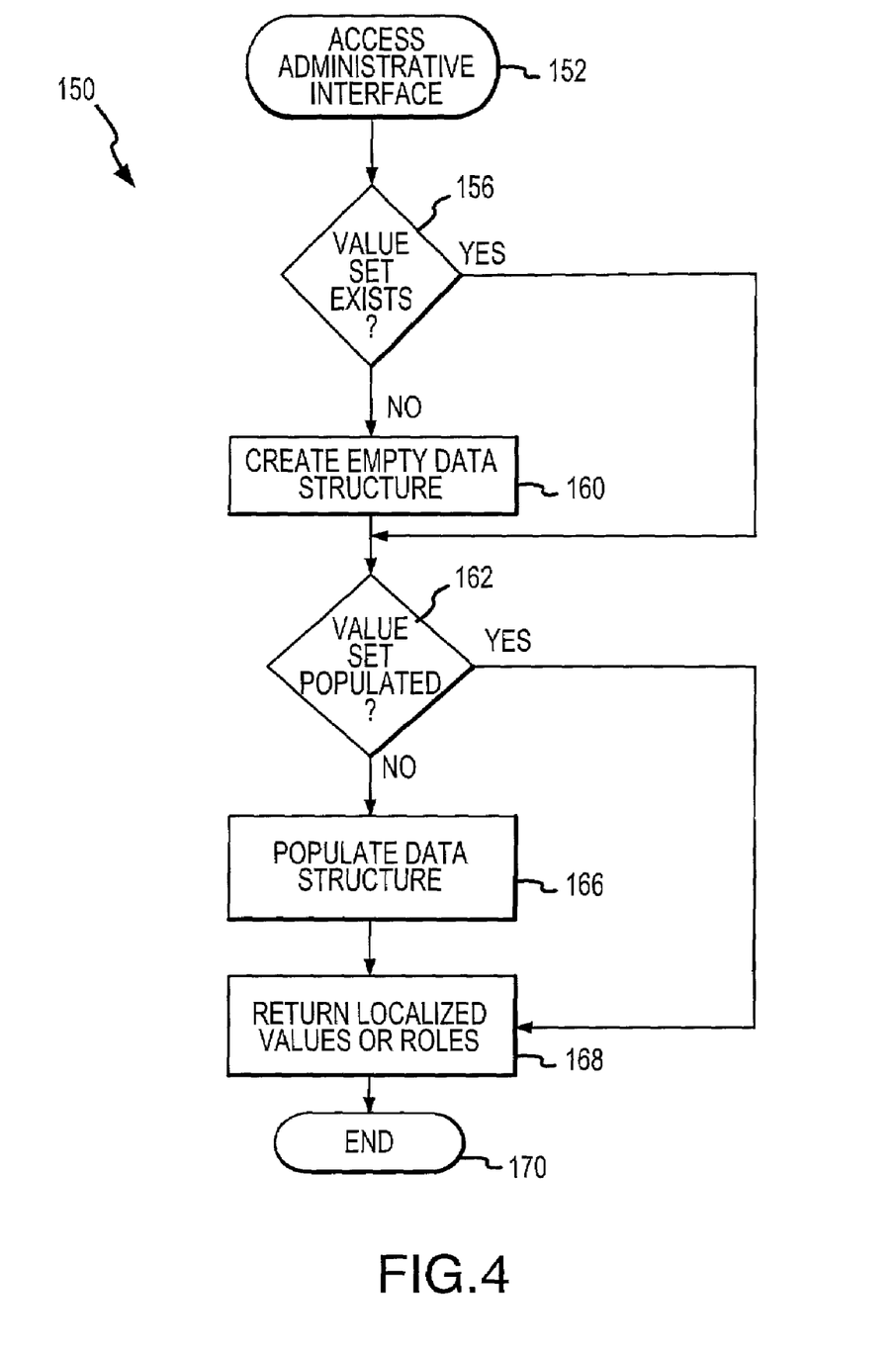
FIG. 4 is a flow diagram illustrating important actions performed by the control system of FIG. 1 in loading the local memory or cache.

FIG. 4 illustrates the process 150 performed by the administrative interface 20 to return values (e.g., element values) via a cached application combination 82, to use cached user role data 98, and to respond if data is not cached or otherwise available. The process begins at 152 with the application 16 being linked with the interface 20 and requesting localized values. At 156 and 162, the cache 34 determines if the value set and populated value exist in memory 34. If the value set, such as an application combination 82 or a user role 116, exists and is populated, the localized values are returned at 168 to the interface 20 which in turn provides them to the application 16.

If the value set does not exist, the method 150 continues at 160 by creating an empty data structure. If the request of the cache 34 is for either an application combination 82 or a user role 116 that does not exist, one is created and added to the cache 34. In one embodiment, an empty object is created to minimize the time which requests for any object are blocked. At 166, the administrative interface 20 attempts to retrieve needed data, such as localized values, from the application value repository 50 in order to populate the empty data structure. If there are multiple requests for the same unpopulated object, one request is used to populate the object and the other requests are blocked until the object is populated or populating fails. Once populated, the object or data structure is returned at 168 and loading process ends at 170.

To more fully understand the population of application combinations 82 as explained above, FIG. 5 illustrates a detailed applications combinations populating process 180. At 182, a check is made to determine if the application combination 82 is populated and if not populated, a call is made to the element value cache 86 to begin populating the applications combination 82 for the requesting application 16. The populating process 180 continues at 184 with incrementing an add request counter to indicate that a new add request has been made. At 184, the method 180 continues with obtaining the geographical hierarchy from repository 50, which allows changes to element values to be provided to the application 16. The geographical area code for the new application combination 82 is added at 188 to an empty list of geographical areas that are to be checked in any selects or data retrievals issued against the localized values 54 of the repository 50.

Figure 5:
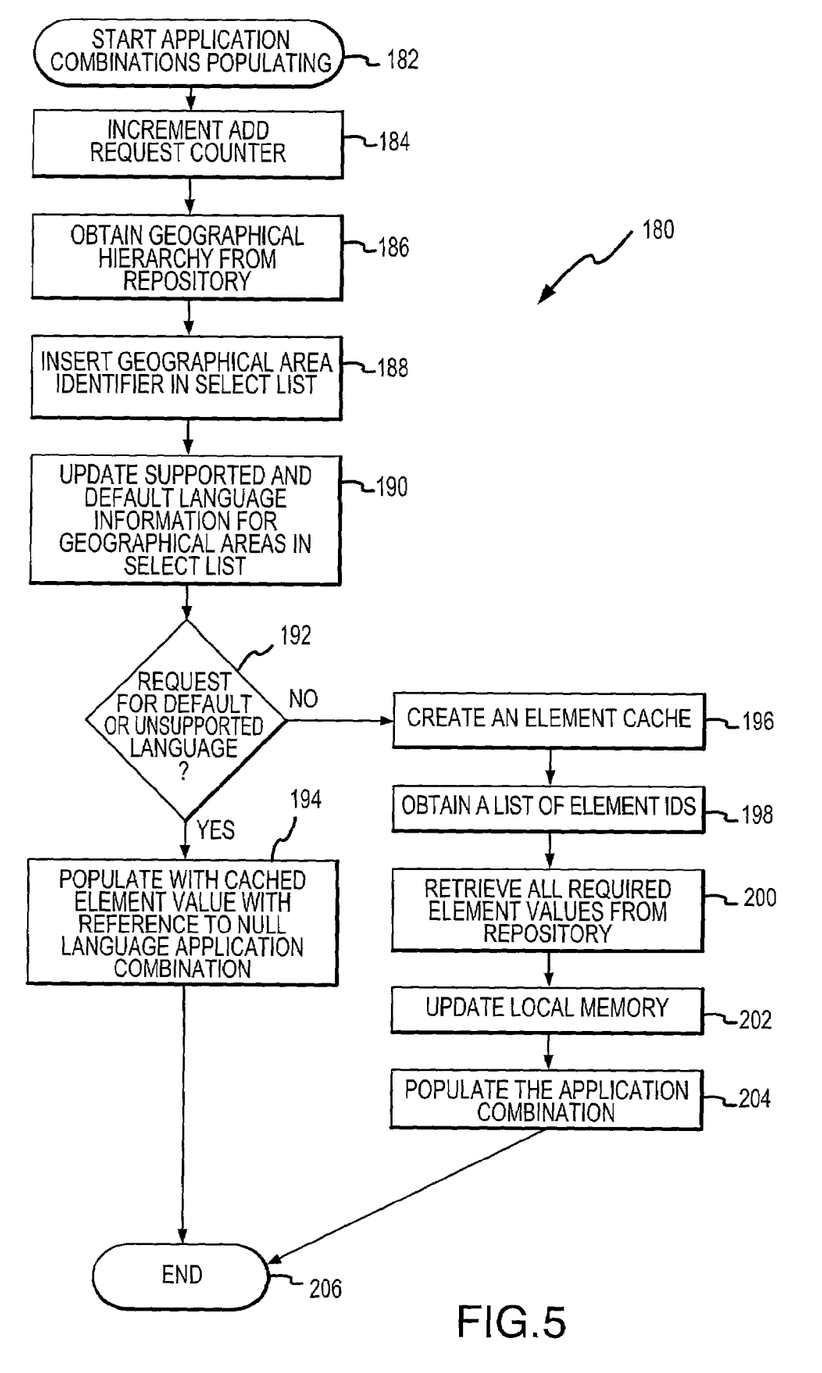
FIG. 5 is a flow diagram illustrating actions taken by the system of FIG. 1 to populate application combinations.

At 190, the supported and default language information in the geographical areas 104 is updated for the list of areas to be checked in the geographical hierarchy. At 192, it is determined whether the request is for default or unsupported language. If yes, the indexed list of element values 88 of the application combination 82 with the same application name and geographical area code but a null language code is used at 194 to populate the new application combination 82. If required, a nested lookup is performed for the null language application combination 82 and its list reused. Then, the populating method 180 ends at 206.

If not a request for a default or unsupported language, the method 180 continues at 196 with the creation of a new element cache 96. The creation step 196 may include looking at the existing element values 88 in the element value cache 86. A single element array is also created that contains the requested application name to provide consistency with the processes used to update the cache 34. At 198 the process 180 continues with obtaining a list of element IDs from the localized values 54 of the repository 50 for each application in the single element array created in step 196. If there are any new elements in the array, their types are obtained from the localized values 54 of the repository 50 and the elements are added to the element cache 96.

At 200, all the required element values that have been changed or are new are retrieved from the localized values 54 of the repository 50. At 202, the local memory 34 is updated by updating the element value cache 86 with the retrieve new element values 88. The list of elements 98 in the application 92 are also updated so that when the memory 34 is automatically updated in future operations the current list of elements 98 in the application 92 is used. Next at 204, the application combination 82 is populated with the element values 88 from the element value cache 86.

Figure 6:
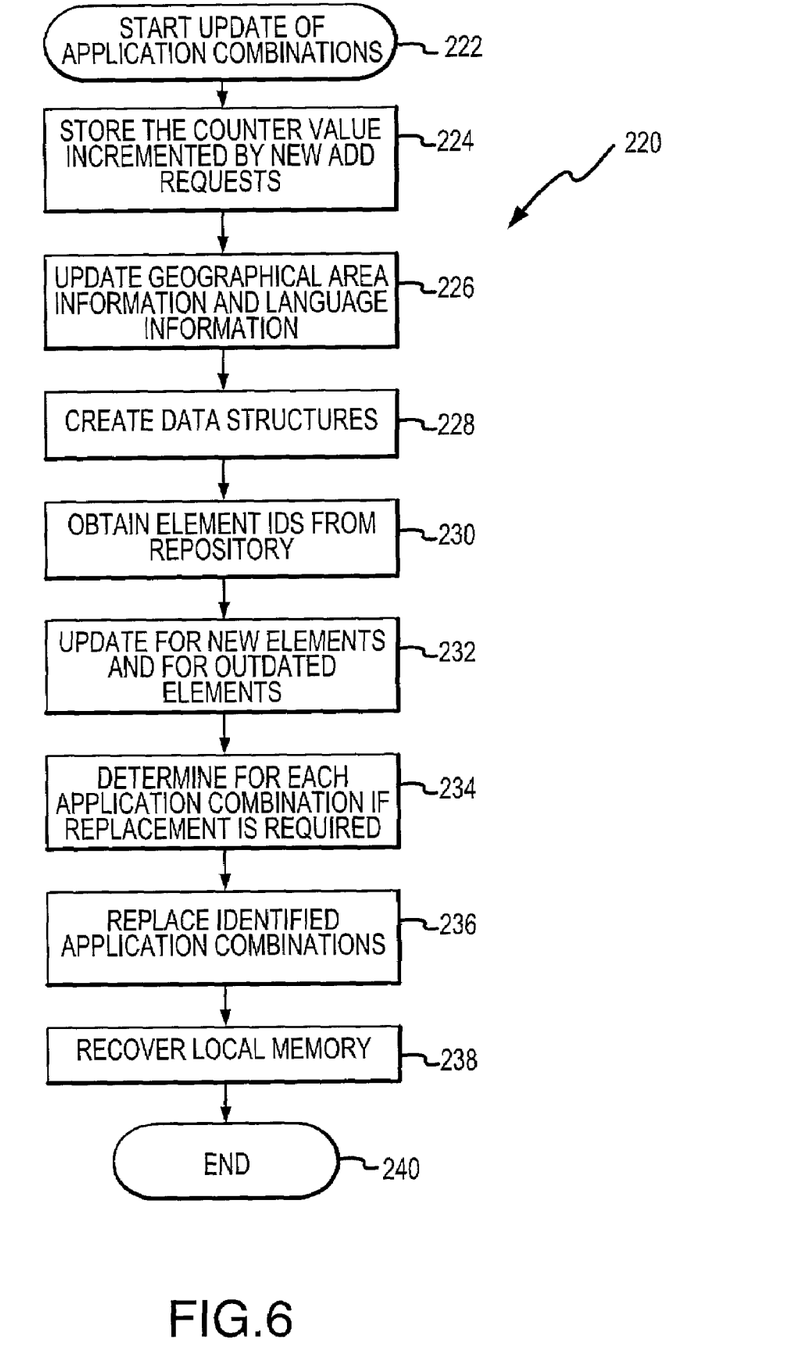
FIG. 6 is a flow diagram illustrating exemplary acts performed by the control system of FIG. 1 to update application combinations in the local memory.

FIG. 6 illustrates a method performed by a mechanism operating as part of the interface 20 or elsewhere on the user node 14. For example, the method 220 may be a background Java™ thread that is used to update the cache or memory 34 with localized values that have been changed in the repository 50. The method 220 is preferably configured such that requests to add new application combinations 82 can take priority over the method 220. The method 220 starts at 222 with checking that new requests have not taken place because in the system 10 changes to values 54 are made in a manner that assures a new request only sees consistent data. The method 220 may function to update the area cache 102 as a whole, update changes to the element value cache 86 as a whole, and make changes to individual application combinations 82 one at a time. Such changes preferably take place in synchronized sections when the method 220 already has the data from the repository 50 it needs so a new request need not be delayed excessively.

The method 220 continues at 224 with storing the counter value that is incremented with a new add request. The counter value is used for the method 220 to determine if a new request has started since the method 220 has begun to update the existing application combinations 82 in the application combination cache 80. At least periodically and preferably frequently during the following actions, the method 220 acts to enter synchronized sections to check the counter. If it finds a request has taken place, the method 220 preferably stops the update and begins substantially immediately at 222. As new requests take place in a synchronized section, the method 220 the new request most likely will have finished by the time the method 220 again checks the counter.

At 226, the geographical area information and language information is updated. This involves obtaining the complete geographical hierarchy from the repository 50 so that changes can be included in updates. If there have been any changes, all application combinations 82 are marked as needing to be replaced to ensure that inheritance of values may have also been modified. The geographical area code of each existing application combination 82 is added to the list of areas that are to be checked in any selects or data requests against the localized values 54 of the repository 50. The supported and default language information in the geographical areas 104 of the cache 102 are updated for the areas in the updated list.

At 228, a new element cache 96 or data structure is created by looking at the existing element values 88 in the element value cache 86. An array of all existing application names is created from the application cache 90. The index into the array is used to identify element IDs for each application in results returned from the localized values 54 of the repository 50. At 230, an array of lists of element IDs from the localized values 54 is obtained for each application in the array of application names just created.

At 232, if there are any new elements, their types are obtained from the repository 50 and the new elements are added as element 98 in the element cache 96. If there are any additional elements 98 in the element cache 96 that are no longer in an application in the repository 50, the method 220 includes removing any element values 88 for these extra elements 98 from the element value cache 86. All required element values that have changed or are new are retrieved from the localized values 54 of the repository 50. A transaction ID on each element value in the repository 50 can be used to identify these changed or new values. The element value cache 86 is then updated with these retrieved new or changed values. For each application 92, a list of hierarchy nodes 110 is created that reflect changed element values 88 used by each application 92. This enables the application combinations 82 to determine if the element values 88 may need to be replaced. If the geographical hierarchy is known or determined to have been changed, this list is not necessary as all application combinations 82 preferably are replaced.

At 234, if the application combinations 82 have been marked as needing replacing because the geographical hierarchy has changed since it was last updated or the application no longer contains the same elements or an element value 88 in the hierarchy used by the application combination 82 has changed, a replacement application combination 82 is created. At 236, for each existing application combination 82, application combinations 82 with null language codes are replaced, and it may be necessary to create a new null language application combinations 82 if an existing one is for a language that has just been marked as unsupported. The existing application combination 82 is then replaced. At 238, memory used by the replaced application combination 82 is recovered as much as practical and the process ends at 240.

The system 10 further includes a mechanism (not shown) for removing localized values from the cache 34 when they have not been accessed for some selectable period of time (such as a time out period of one hour). According to this aspect of the invention, whenever an application combination 82 or user role 116 is accessed, a last accessed time parameter is updated to reflect such accessing. In the case of application combinations 82 that share the same indexed list of element values 88 as an application combination with a null language code, the last accessed time parameter of the application combination 82 with the null language code is also changed. The last accessed time parameter is periodically compared with the selected time period for deletion and as appropriate, the values are removed from the cache 34, thereby freeing up memory for other uses.

According to yet another feature of the invention, when an application combination 82 is created for a request to access a combination of application name, geographical area code, language code, and staged flag, an XML file is also created. The XML file contains XML elements for all localized values that are not file types. The XML file is configured to indicate which application, geographical area, language, and staged flag it contains and include the textual value of each element value 88. The XML file is generally used by XSL stylesheets stored in the repository 50 to incorporate localized values from the XML file in an output page, such as an HTML help page. One version of the XML stylesheet may be utilized in the system 10 or the XSL stylesheet themselves may be localized.

In addition to storing localized stylesheets in the repository 50, some embodiments of the control system 10 store stylesheets that automatically transform with the XML file to create another stylesheet that contains localized values from the XML file and incorporates additional application data that is supplied by the application as an XML file.

To stress important features of the control system 10 and services available using the invention, some of the key concepts are now discussed more fully that explain concepts used to maintain the localized data in the system 10. The present invention provides a localized value control system that allows application developers to define their system in terms of a network of "applications." For example, a system may contain an application A (or page A), an application B, and an application C. To use the control system, the developer sets up four applications with applications A, B, and C being child applications of the system "application." If there is a common piece of functionality used on a number of these applications or pages, this common feature is created as another application, e.g., application D, and linked to the relevant applications or pages (such as applications A and B) as a child application. This linking allows developers to configure parts of their system as reusable components. The control system includes features that prevent circular links or relationships from being assigned (such as an application being both a child and a parent of another application).

Each of the applications within the application network (and control system) is linked to each of the localizable items it uses. For example, an application representing a web page is linked to each of the localizable items shown on the web page. The collection of localizable items in the control system is preferably a flat store (or other useful data storage arrangement) of all the items which could be used by client applications in the control system and is preferably indexed by name. This name is used by client computer systems to request a value for a particular item from the collection or cache of items (which is typically created by a service API such as the administrative interface 20). To keep the list of localizable items manageably short for application developers, the use of an item may be limited to a single application and its child applications. This practice may be altered by providing a separate collection of shared or common items that are needed or useful to a number of applications within a particular network or computer system.

The service API uses the application network or linking to identify the localizable items that need caching for a particular client computer system (e.g., for a particular system "application"). Identification of items to cache is achieved by loading values for all the localizable items that are linked to the application(s) specified by the client computer system or to child applications of the specified application. In this example, there is no inheritance of values with the application network being used to identify the list of localizable items for which values are required.

Users of the control system are able to use this application network to effectively and efficiently find the localizable items for which they want to maintain localized values. For example, if a user is a translator and is told to modify the Japanese value of a particular text item used on page or application D of the system application, the user can find the relevant item by displaying a list of the text items used on application D (a child of the system application). The localized value, i.e., the Japanese value, can then be modified by the translator.

For any one localizable item, there may be any number of values with each value being specific to a particular geographical area and/or language. The service API or administrative interface utilizes a unique algorithm or methodology to determine the value to use for a localizable item given a user in a particular geographical area with a particular preferred language. The algorithm begins with determining if the user's preferred language is supported in the user's country. If supported, the interface language is set to the user's preferred language. If not supported, the interface language is set to the default language for the user's country. The control system maintains in memory a list of the languages supported in each geographical area.

The algorithm continues with setting the current geographical area to the geographical area that includes the user's country. If a value for the interface language exists for the current geographical area, the interface returns this value and exits the algorithm. If a language-independent value exists for the current geographical area, the interface returns this value to the user and exits the algorithm. If the current geographical area has a parent geographical area, then the interface sets the current geographical area to its parent's value and again checks for a value for the interface language. Otherwise, an empty value is returned to the user. In this manner, a value for a "parent" geographical area (e.g., worldwide) is inherited by its "child" geographical area (e.g., Europe, Asia, Americas, and the like) unless there is a more specific value defined at the "child" level.

As a more specific example of such inheritancy, a localizable item representing a piece of textual information on one or a number of web pages may have a value for the following areas and languages: (1) worldwide default (i.e., language-independent) value (region=world, language=none); (2) worldwide French value (region=world, language=French); (3) English value specific to Europe (region=Europe, language=English); (4) English value specific to United Kingdom (region=United Kingdom, language=English); and (5) French value specific to France (region=France, language=French). The result of such a configuration is that for an English user outside of Europe the interface will return value (1). For a French user outside of France, the interface returns value (2). For an English user in Europe but not in the United Kingdom, the interface returns value (3). For an English user in the United Kingdom, the interface returns the value (4) and finally, the interface returns the value (5) when the user is French and in France.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, it will be clear to those skilled in the art that the administrative interface and cache monitoring and updating of localized values may be performed by separate mechanisms operating on a user node as shown in FIG. 1 or as a single mechanism operating on the node 14 or a separate computing device linked to one or more applications and communicatively linked to a repository storing localized application values. Further, one centralized repository may be used or a number of repositories may be provided, such as one for each geographic region (e.g., one for each country or each continent). The repositories may also be positioned within a user computer system or at a user node.

We claim:

1. A computer system for providing localized application data to computing devices linked to a data communications network, comprising:

a client device linked to the communications network including a running application, an administrative interface in communication with the application and the communications network, and a local memory for storing localized application values used by the application; and an application value repository linked to the communications network for storing localized application values used by the computing devices;

wherein the administrative interface is operable to receive a request from the application for application values and to respond by selectively retrieving the localized application values corresponding to the request from the local memory and the application value repository, wherein the localized application values are selected based upon a geographical area and a language selection included in the request, and wherein the application localized values stored in the application value repository include property values.

2. The computer system of claim 1, wherein the client device further includes an update mechanism operable to monitor the localized application values at the application value repository and to update the localized application values in the local memory.

3. The computer system of claim 1, wherein the localized application values stored in the local memory are selected based on prior requests from the application and are removed from the local memory when a last accessed time parameter indicates a period of inactivity has been exceeded.

4. The computer system of claim 1, wherein the client device further includes a mechanism operable to generate a localized eXtensible Markup Language (XML) file comprising at least a portion of the localized application values.

5. The computer system of claim 4, wherein the application value repository further stores a stylesheet that is adapted for combining with the XML file to produce a localized stylesheet.

6. The computer system of claim 1, wherein the localized application values include user roles indicating data access levels for users of the application, the user roles being localized to allow variation based on geographical locations selected by the users of the application and being used by the administrative interface in the selective retrieving of the localized application values.

7. The computer system of claim 1, further comprising a second client device linked to the communications network running the application, wherein users of the second client device select different geographical areas than the client device and wherein the localized application values retrieved by the second client device from the application value repository differ from the localized application values retrieved by the client device based on the different geographical areas.

8. A method in a computer system for controlling generation of and access to localized application data, comprising:

receiving a request for application data from an application;

determining if localized application values corresponding to the request are present in local memory of the computer system;

when determined present, retrieving the localized application values from the local memory;

when determined not present, retrieving the localized application values from an application value repository; and returning retrieved localized application values to the application;

wherein the request includes an application name, a geographical area code, a language code, and at least one element name which are used in the retrieving steps to provide localized application values matching the geographical area code and the language code.

9. The method of claim 8, further comprising when not present, creating an empty data structure, populating the data structure with the localized application values from the repository, and storing the populated data structure in the local memory.

10. The method of claim 9, wherein the data structure includes a list of element values appropriate for application name, geographical area, and language information provided in the request.

11. The method of claim 10, wherein the populating includes obtaining a geographical hierarchy from the repository and checking nodes in the geographical hierarchy for the listed element values beginning at a node corresponding to the supplied geographical area and language information and moving upward to and ending at a top node.

12. The method of claim 8, further including updating the localized application values in the local memory to reflect modifications to the localized application variables in the application value repository.

13. The method of claim 12, wherein the updating is performed at a time when the updating is determined to not affect performance of the application as perceived by a user of the application.

14. The method of claim 8, further including constructing a data structure from the retrieved localized application values and storing the constructed data structure.

15. The method of claim 14, further including monitoring for changes in the localized application values corresponding to the retrieved localized application values and repeating the constructing after a change is identified in the monitoring to create a refreshed data structure.

16. An interface for providing localized data to an application operating on a computer system, the interface comprising computer readable program code devices for:

receiving a request for application data from an application;

determining if localized application values corresponding to the request are present in a cache structure of the computer system, the localized application values comprising values specific to a geographical area and language identified in the request;

when determined present, retrieving the localized application values from the cache;

when determined not present, retrieving the localized application values from an application value repository; and returning retrieved localized application values to the application.

17. A computer readable medium containing a data structure for storing and providing current localized application values to one or more applications running in a geographically disburse computer network, the data structure comprising:

an application cache storing application combinations representing each combination of names of the running applications, geographical areas utilized in the computer network, and codes identifying languages supported within the computer network;

an element value cache storing element values comprising localized application values required by the running applications, wherein each of the element values comprises a localized value for a node in a tree structure in which each of the nodes corresponds to a combination of a geographical area, a supported language, and a staged or released value.

18. The data structure of claim 17, further including an application user cache storing user roles that indicate for users of the applications the localized application values the users can access based on the staged or released value.

* * * * *